(12) United States Patent
Kuzmenka

(10) Patent No.: US 7,728,620 B2
(45) Date of Patent: Jun. 1, 2010

(54) SYSTEM INCLUDING PREEMPHASIS DRIVER CIRCUIT AND METHOD

(75) Inventor: Maksim Kuzmenka, Munich (DE)

(73) Assignee: Qimonda AG, Munich (DE)

( * ) Notice: Subject to any disclaimer, the term of this patent is extended or adjusted under 35 U.S.C. 154(b) by 0 days.

(21) Appl. No.: 12/111,724

(22) Filed: Apr. 29, 2008

(65) Prior Publication Data

US 2009/0267640 A1    Oct. 29, 2009

(51) Int. Cl.
*H03K 19/003* (2006.01)
*H03K 3/00* (2006.01)

(52) U.S. Cl. ............................. 326/30; 326/27; 326/21; 326/86; 326/87; 327/108; 327/112

(58) Field of Classification Search ................. 327/108, 327/261, 291, 170–172, 112; 326/32, 27
See application file for complete search history.

(56) References Cited

U.S. PATENT DOCUMENTS

| | | | | |
|---|---|---|---|---|
| 4,829,199 A | * | 5/1989 | Prater | 326/27 |
| 5,231,319 A | * | 7/1993 | Crafts et al. | 327/277 |
| 6,759,868 B2 | * | 7/2004 | Helt et al. | 326/30 |
| 6,956,407 B2 | * | 10/2005 | Baig et al. | 327/65 |
| 7,155,164 B1 | * | 12/2006 | Savoj | 455/43 |
| 7,183,813 B2 | * | 2/2007 | Kasanyal et al. | 327/65 |
| 7,215,144 B2 | * | 5/2007 | Mitby et al. | 326/82 |
| 7,512,193 B1 | * | 3/2009 | Shing et al. | 375/296 |
| 2004/0108877 A1 | * | 6/2004 | Cho et al. | 327/158 |
| 2007/0075745 A1 | * | 4/2007 | Song et al. | 326/83 |
| 2007/0268047 A1 | * | 11/2007 | Hopkins et al. | 327/111 |

* cited by examiner

*Primary Examiner*—Vibol Tan
(74) *Attorney, Agent, or Firm*—Dicke, Billing & Czaja, PLLC

(57) ABSTRACT

A system including a preemphasis driver circuit and a method. One embodiment includes an output terminal, a main driver coupled between the input terminal and the output terminal and an auxiliary driver coupled to the output terminal, wherein at least one unclocked delay element is coupled between the input terminal and the auxiliary driver.

13 Claims, 8 Drawing Sheets

SYSTEM INCLUDING PREEMPHASIS DRIVER CIRCUIT AND METHOD

BACKGROUND

The present invention relates generally to a system including a preemphasis driver circuit, a method for operating a system preemphasizing an input signal to drive an output terminal and a method for driving a loaded transmission line with preemphasis.

The preemphasis of a data signal is a known method of improving the signal integrity of data transmitted to a receiving terminal and in particular if the data is transmitted over long or lossy transmission lines. Normally higher frequency spectral components of a data signal are affected by stronger channel attenuation.

Therefore, increasing the data rate of the data signal, or increasing the length or the losses of a transmission line loaded at a receiving terminal, leads to an increasingly closed eye aperture when the transmitted data signal is analyzed using eye diagrams. This increasingly closed eye diagram corresponds to an increasing corruption of the data signal meaning that it becomes more and more difficult to reconstruct the correct signal value at the receiving terminal.

Basically, as a countermeasure preemphasis can be used to predistort the signal to be transmitted by increasing or emphasizing the higher order harmonics in the signal to be transmitted. In other words, preemphasis leads to a compensation of the low-pass behavior of the transmission channel (e.g., a lossy transmission line) through usage of a driver with high-pass filtering behavior.

However, known realizations of preemphasis driver circuits suffer from various structural and implementational disadvantages.

For these or other reasons, there is a need for the present invention.

BRIEF DESCRIPTION OF THE DRAWINGS

The accompanying drawings are included to provide a further understanding of the present invention and are incorporated in and constitute a part of this specification. Most of the drawings illustrate embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

FIG. 8 illustrates an eye-diagram of a simulated data signal after transmission over a predefined PCB trace at a predefined receiver impedance with preemphasis switched on.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Preemphasis of a digital data signal can be realized in a number of ways. According to one of the simplest first order preemphasis methods, it is assumed that every bit of the data signal to be transmitted which is different from the previous one should be transmitted with a higher amplitude. For instance, in a sequence like 0101001000111100001111 "strong" bits which should have a higher amplitude for transmission are marked bold.

A typical realization of a preemphasis driver circuit providing the functionality to increase the amplitude of the above mentioned "strong bits" includes a main driver, which provides a larger part of the driving strength, and an auxiliary driver. The auxiliary driver works in parallel with the main driver and generates preemphasis pulses whenever the data signal to be transmitted changes its value.

Both, the main driver and the auxiliary driver drive a common output terminal. However, to provide the above functionality, the input signal to the auxiliary driver should be delayed by the duration of 1-bit as compared to the input signal to the main driver.

In some more complicated realizations of a preemphasis driver circuit—in particular in those for cable drivers—second, third or even higher order preemphasis may be used. The corresponding higher order preemphasis driver circuits mainly differ in the number of auxiliary drivers and the number of delay elements for the delay by the duration of 1-bit.

In particular when a preemphasis driver circuit is to be implemented as an impedance matched push-pull driver with respect to a receiving terminal, the structure of the output stage of such a preemphasis driver may be very complicated because of the requirement to change the signal level while keeping the output impedance constant.

Figure 1:
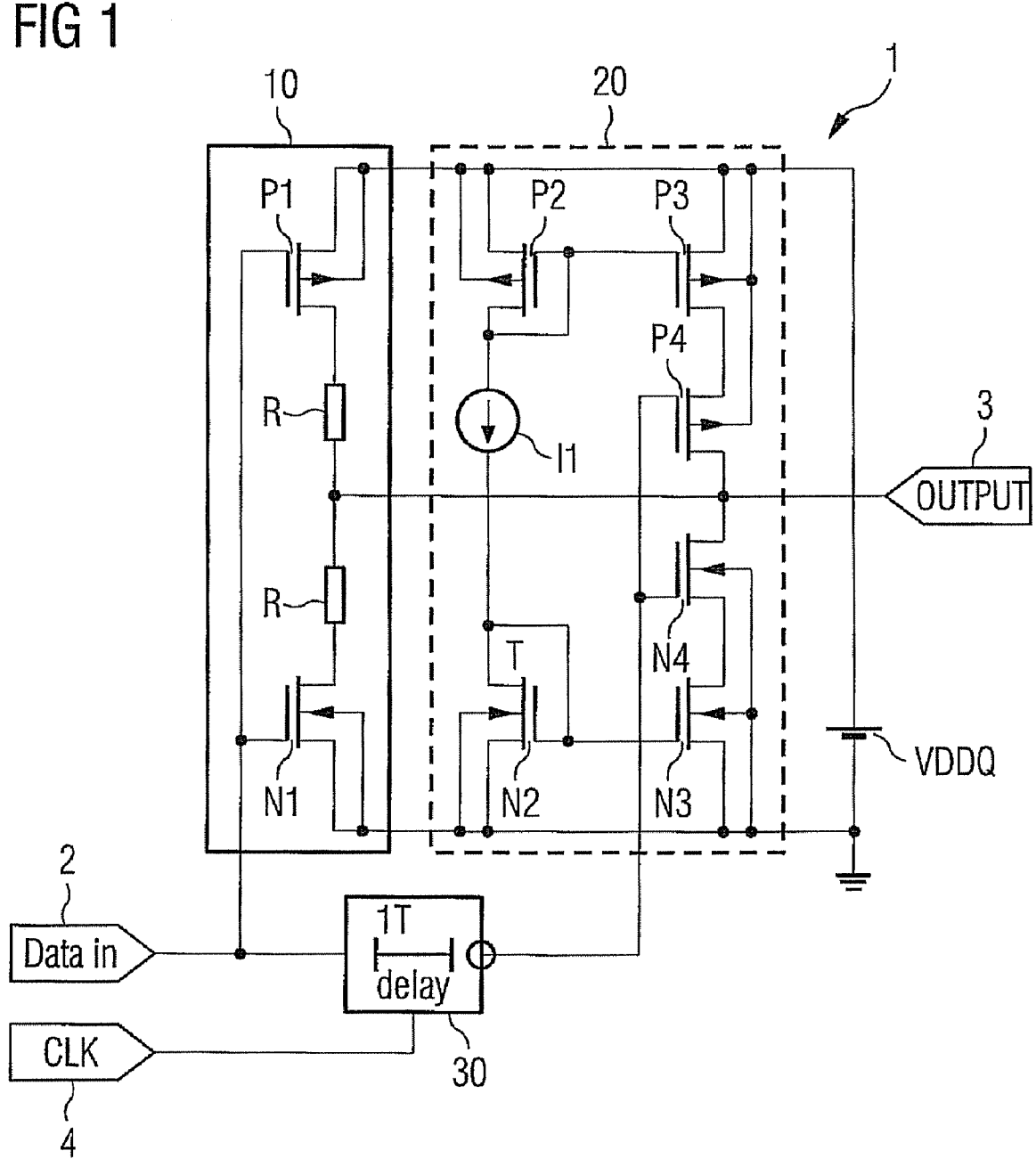
FIG. 1 illustrates a schematic of a conventional preemphasis driver circuit with a clocked delay element.

A common element of conventional implementations of such preemphasis driver circuits is that the 1-bit delay element is normally realized by a clocked D-type flip-flop. The need for almost perfect synchronization of the main driver and the auxiliary driver—the latter forming the preemphasis part of the preemphasis driver circuit—makes the design of such circuits very difficult or even impossible, for example in case of a bit duration of 150 ps and a delay per gate of 50 ps. FIG. 1 illustrates the schematic of a conventional example of one possible implementation of an impedance matched push-pull driver with a D-type flip-flop 30 as clocked delay element.

In the conventional preemphasis driver circuit 1 example of FIG. 1 the main driver 10 includes the P-FET transistor P1 and the N-FET transistor N1 as a push-pull stage whose gates are driven by a data input signal at the input terminal 2. The drains of the P-FET transistor P1 and the N-FET transistor N1 are connected to the output terminal 3 of the preemphasis driver circuit 1 via an output resistor R respectively.

The auxiliary driver 20 includes a P-FET transistor P4 and an N-FET transistor N4 as switches for the currents provided by the current mirrors formed by the P-FET and N-FET transistor pairs P2/P3 and N2/N3 respectively. For this purpose, the drains of the P-FET transistor P4 and the N-FET transistor N4 are connected together and both are directly connected to the output terminal 3 of the preemphasis driver circuit 1. The gates of the P-FET transistor P4 and the N-FET transistor N4 are connected together and both are driven by the output of the D-type flip-flop 30.

Both the main driver 10 and auxiliary driver 20 drive the common output terminal 3. Since the differential resistance of the above mentioned current mirrors is very high, adding pull-up or pull-down current will only change the signal level at the output terminal 3, while the output impedance at the output terminal 3 will be substantially unchanged.

One potential problem of a conventional preemphasis driver circuit 1 as illustrated in FIG. 1 is that the relatively complicated structure of its schematic leads to a relatively irregular layout. In addition, as can been seen from FIG. 1, in conventional implementations of a preemphasis driver circuit, the auxiliary driver 20 includes a completely different structure than the main driver 10 such that no part of the main driver 10 block can normally be reused.

Furthermore, with the transistors P4 and N4, it includes transistors directly connected to the output terminal 3, which might for example be connected with an external ball or pin of a semiconductor device, and may therefore be affected by ESD damage in case no further ESD protection is provided.

As illustrated in the schematic of the conventional preemphasis driver circuit 1 in FIG. 1, the delay, by which the input signal is delayed to feed the auxiliary driver 20, is clock synchronous since the D-type flip flop 30 is used as clocked delay element.

Regarding timing requirements of D-type flip flop 30, it has to work at full data rate of the data input signal at input terminal 2 and should have a well defined delay of the duration of 1-bit of the maximum data rate of the data input signal. Correspondingly, the clock signal at the clock terminal 4 has to be aligned very good with data input signal at the input terminal 2.

A usually reliable realization of such an aligning method costs doubling of the complete circuitry in the data path. This means that one instance of the circuitry in the data path is used for the direct channel whose input signal is the signal at the input terminal 2 and that another instance of the circuitry in the data path is used for the channel whose input signal is delayed by 1-bit as compared to the direct channel.

Under normal conditions, only this aligning method allows to get acceptable timing matching. However—even in this case—additional auxiliary drivers or re-drivers cost mismatch in the alignment between the input signal to the main driver 10 and the input signal to the auxiliary driver 20, i.e., cost extra skew, in particular in conditions of a very noisy supply voltage VDDQ. This results in a doubling of the clock load too and leads to additional difficulties for a matched clock wiring.

A further problem with conventional preemphasis driver circuits arises in case the main driver is partitioned into parts—e.g., with binary weighted output levels. Typically, these parts of the main driver can be controlled separately for digital calibration purposes by a control code over a control bus. In this case of a calibratable main driver output level, the auxiliary driver has to adopt the calibration partitioning with a certain scaling and has to be controlled with the same control code, or the reference current of the current mirrors of the auxiliary driver—in the example of FIG. 1 I1—has to change accordingly.

For some applications, conventional preemphasis driver circuits realized with clocked delay elements—in particular using clocked flip-flops—confront the designer with a complicated task because of space, power and clock distribution considerations.

A system including a preemphasis driver circuit and/or a method for operating a system including preemphasizing an input signal to drive an output terminal and/or a method for driving a loaded transmission line with preemphasis is provided.

Figure 2:
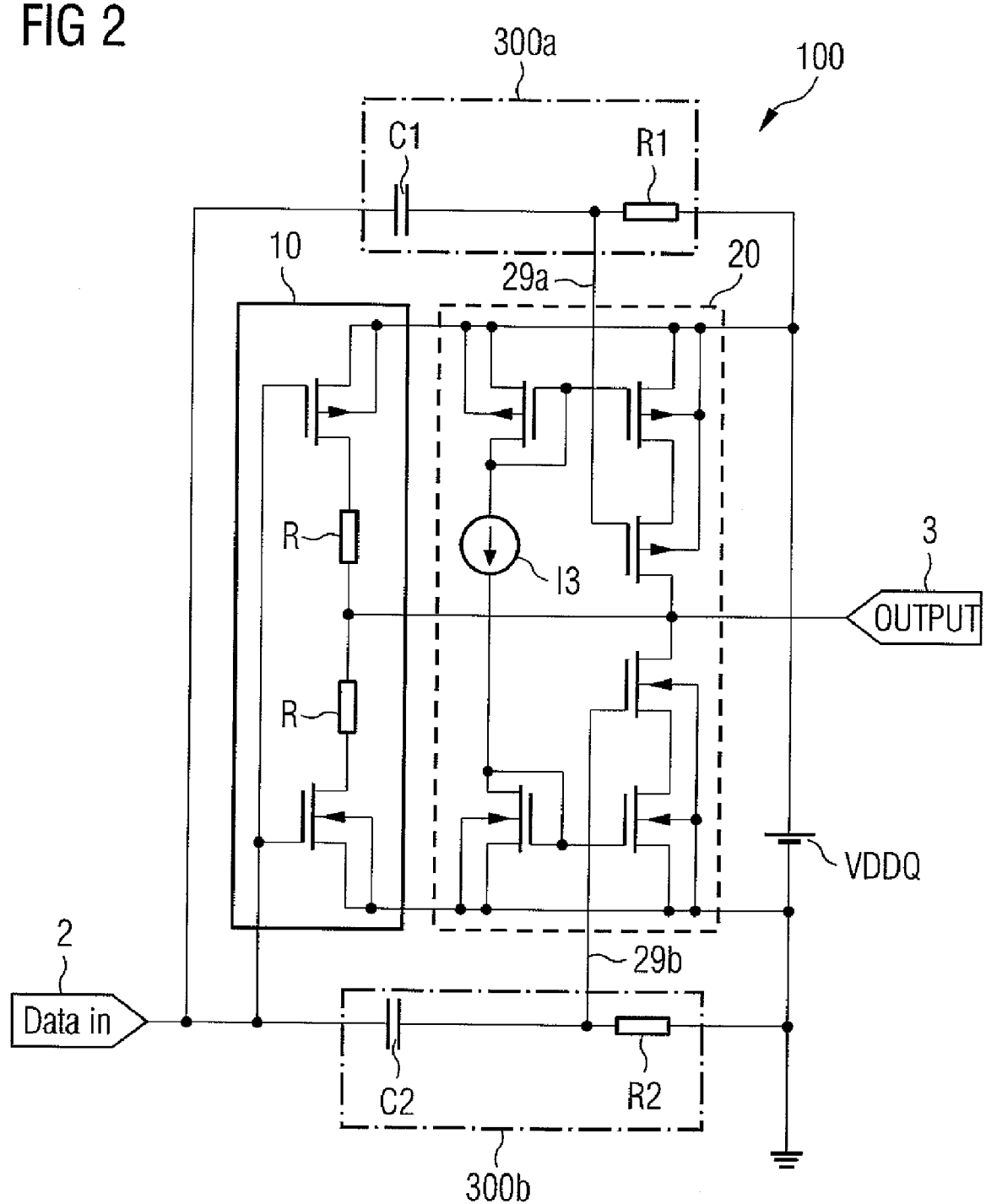
FIG. 2 illustrates a schematic of a preemphasis driver circuit with RC-circuits as unclocked delay element.

FIG. 2 illustrates one embodiment of a system including a preemphasis driver circuit 100 realized with an unclocked delay element. The preemphasis driver circuit 100 includes an input terminal 2, an output terminal 3. The main driver 10 is coupled between the input terminal 2 and the output terminal 3. Furthermore the preemphasis driver circuit 100 includes an auxiliary driver 20 coupled to the output terminal 3. In the embodiment according to FIG. 2 at least one unclocked delay element is coupled between the input terminal 2 and the auxiliary driver 20. Moreover, in the embodiment according to FIG. 2, the at least one unclocked delay element is the RC-circuit 300a, 300b. Compared to the example of a conventional preemphasis driver circuit in FIG. 1, the embodiment of a preemphasis driver circuit 100 according to FIG. 2 is simplified but not less efficient.

Here, the functionality of generating preemphasis pulses whenever the data signal at the input terminal 2 changes its value is provided by the RC-circuits R1/C1 300a and R2/C2 300b which form an unclocked delay element. Here, the functionality of this unclocked delay element can also be understood as a differentiation of the data signal at the input terminal 2, since the RC-circuits R1/C1 300a and R2/C2 300b form a differentiation circuit which—as required—generates preemphasis pulses at the inputs 29a, 29b to the auxiliary driver 20 whenever the data signal at the input terminal 2 changes its value.

The fact that the RC-circuits R1/C1 300a and R2/C2 300b may be smaller than a clocked delay element—and in particular a clocked delay element with additional circuitry for timing alignment purposes—and that the RC-circuits may even be symmetrically arranged as already symbolically indicated in the schematic of the embodiment of the preemphasis driver circuit 100 according to FIG. 2 not only simplifies the schematic of the preemphasis driver circuit 100 but also the corresponding layout a lot.

Moreover, one embodiment of the preemphasis driver circuit 100 according to FIG. 2 provides some additional advantages. First of all, no clock signal is needed to provide a delayed variant of the input signal at the input terminal 2 to the inputs 29a, 29b of the auxiliary driver 20.

Secondly, the simplified circuit design architecture offers an inherent matching of the delay between the input signal to the main driver 10 and the input signals to the auxiliary driver 20 if the values of R1/C1 and R2/C2 are adequately chosen. Generally, the duration of the pulses generated by the RC-circuits R1/C1 300a and R2/C2 300b as unclocked delay element whenever the data signal at the input terminal 2 changes its value should be equal or shorter than the duration of 1-bit at the maximum data rate of the data signal at the input terminal 2.

Thirdly, the dispensability of a clock signal also renders the provisions for correct alignment between data input signal and clock signal superfluous, i.e., also no extra re-driving circuitry is necessary.

However, it should be assured that for the RC-circuits R1/C1 300a and R2/C2 300b components are chosen which—in the used technology—provide the sufficient stability over process, voltage and temperature variations, since—usually—this stability with respect to integrated resistor or capacitor components is not very good.

Figure 3:
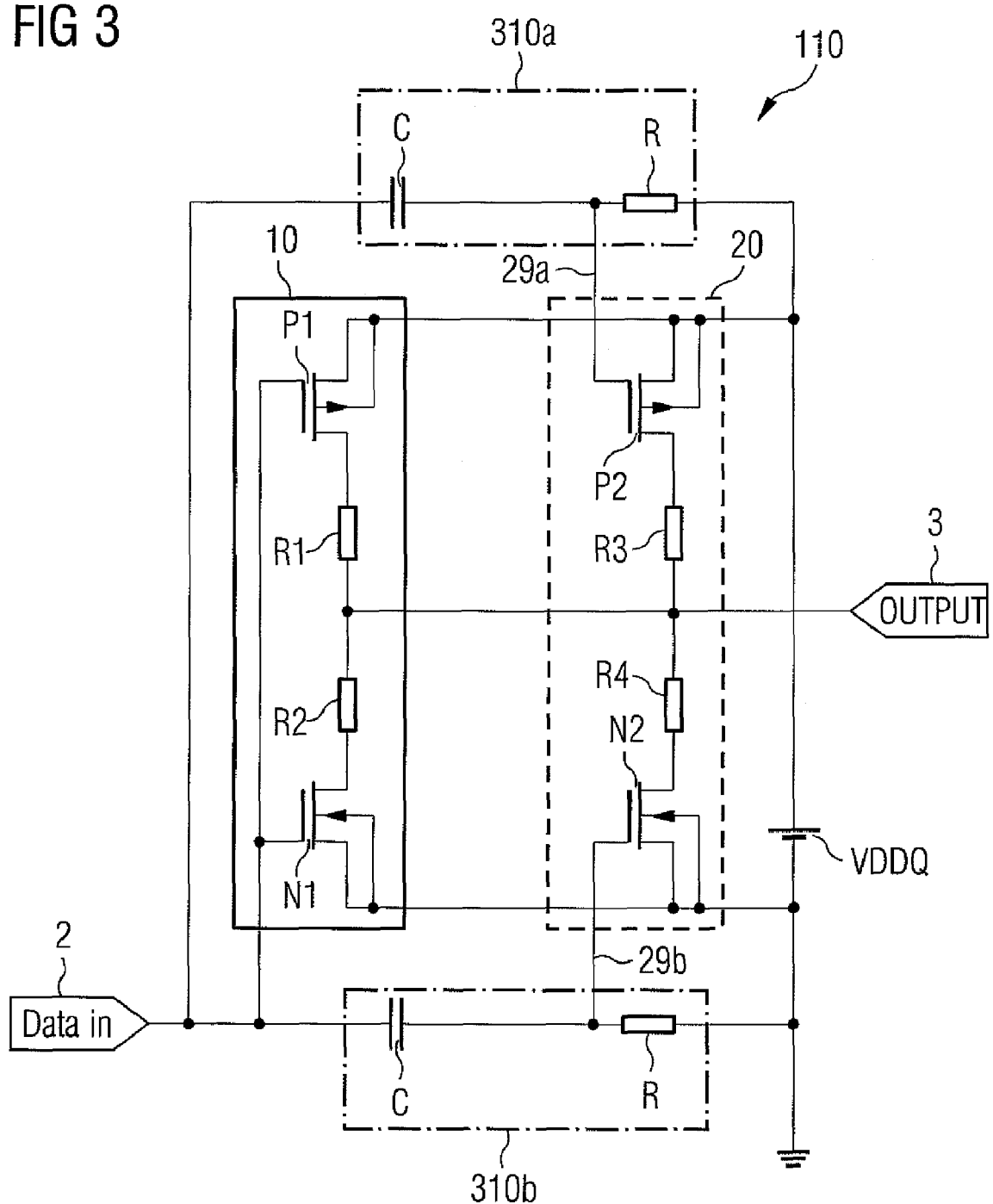
FIG. 3 illustrates a simplified schematic of a preemphasis driver circuit with RC-circuits as unclocked delay element for a perfectly terminated receiving terminal.

FIG. 3 illustrates a further embodiment of a preemphasis driver circuit 110 realized with unclocked delay elements. The embodiment of a preemphasis driver circuit 110 according to FIG. 3 may be used in case a transmission line connected to the output terminal 3 of the preemphasis driver circuit 110 is perfectly terminated on the far end. In this case, the requirement of constant driver output impedance is not sufficient anymore.

However, the resulting dispensability of the current mirrors P2/P3 and N2/N3 and of the generation of the reference current I3 with respect to the embodiment in FIG. 2 leads to a schematic and a layout of the preemphasis driver circuit 110 which can be simplified even more.

In addition to the removal of the current mirrors, the auxiliary driver 20 including the transistors P2 and N2 may be realized as a section of the main driver 10. As a result, also the layout of the preemphasis driver circuit 110 may be implemented in a really uniform way.

Furthermore, since in the embodiment of FIG. 3 there are no output terminals of the transistors of the main driver 10 or of the auxiliary driver 20 which are directly connected to the output terminal 3 of the preemphasis driver circuit 110, the latter is already well protected against possible the ESD damages without necessarily requiring additional ESD protection.

As an alternative to the RC-circuits R/C 310a, 310b of the embodiment in FIG. 3 which are used as an unclocked delay element for generating the 1-bit delay of the data input to the auxiliary driver 20, this delay function may be implemented with at least one inverter as unclocked delay element.

Figure 4:
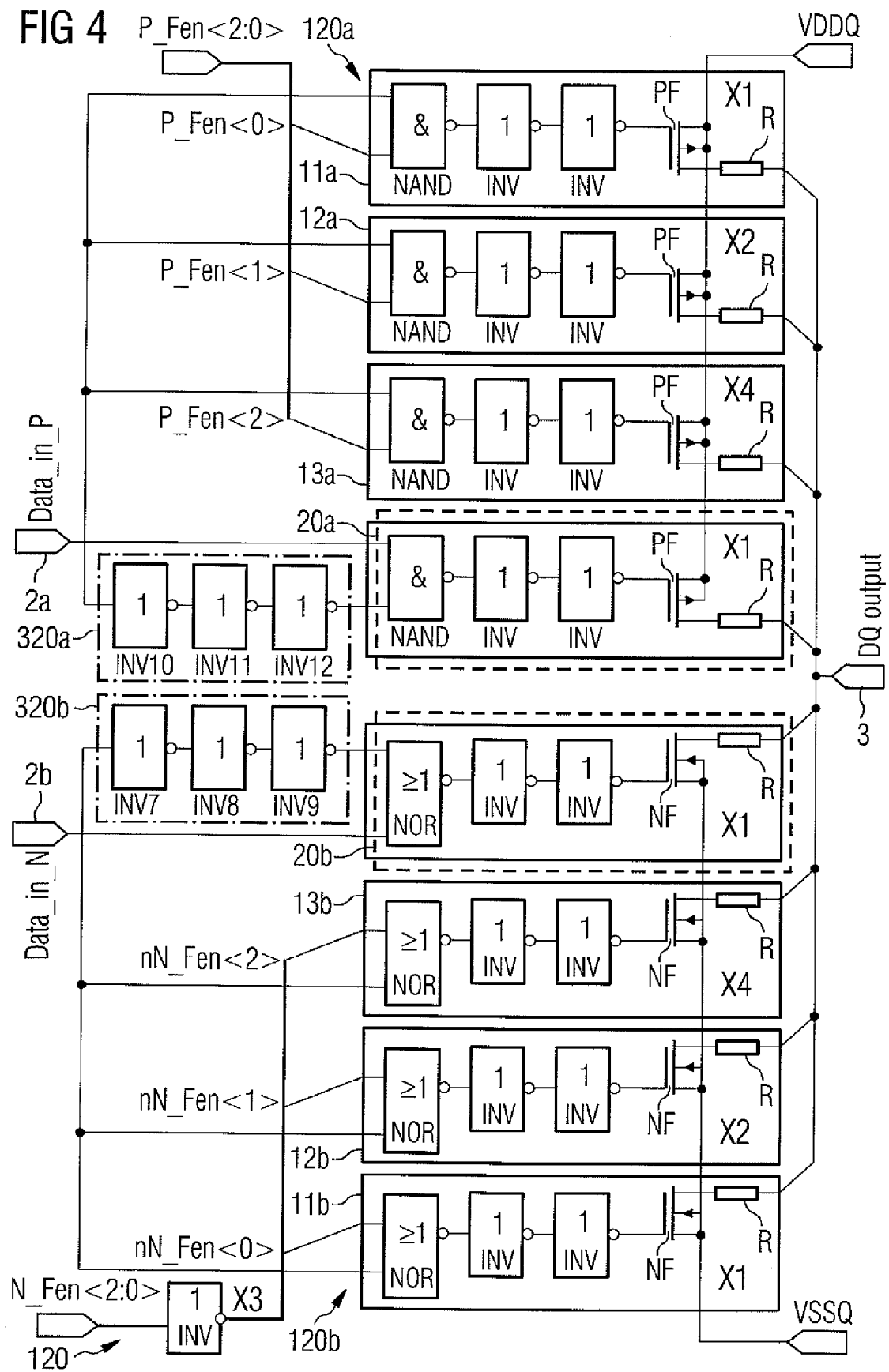
FIG. 4 illustrates the schematic of a preemphasis driver circuit with inverters as unclocked delay elements.

As an example, FIG. 4 illustrates an embodiment of a preemphasis driver circuit 120 realized with a delay chain of three inverters 320a, 320b as unclocked delay element in the pull-up 120a and the pull-down part 120b of the preemphasis driver circuit 120 respectively. In this embodiment, the parts forming the main driver 10a, 10b and the auxiliary driver 20a, 20b are based on corresponding schematic and corresponding layout cells. Therefore again the overall schematic and layout of the preemphasis driver circuit 120 is simplified a lot.

In the following—for the sake of simplicity—only the parts of the pull-up part 120a of the preemphasis driver circuit 120 in the upper part of FIG. 4 are referred to. However, corresponding parts of the pull-down part 120b of the preemphasis driver circuit 120 are designated with corresponding reference numbers, e.g., the pull-down part of the auxiliary driver is designated with reference number 20b instead of reference number 20a for the pull-up part of the auxiliary driver.

For calibrating the output level of the main driver 10a of the preemphasis driver circuit 120, the main driver 10a is partitioned into a plurality of driver fingers. In the embodiment illustrated in FIG. 4, the main driver 10a is calibratable based on binary processes by placing a basic driver finger cell 11a one, two and four times respectively, i.e., by building up the main driver 10 by groups of corresponding numbers of instances in parallel. In this way, the output level of the main driver 10a may be selected by a binary control code.

For the sake of clarity, this repeated placing of the basic driver finger cell 11a (marked with X1) has been indicated in the schematic of FIG. 4 by using another hierarchy level in the schematic for a first extended driver finger cell 12a which includes two basic driver finger cells in parallel (marked with X2), and a second extended driver finger cell 13a which includes four basic driver finger cells in parallel (marked with X4).

As part of the driver fingers of the main driver 10a of the pull-up part 120a of the preemphasis driver circuit 120, NAND gates are used for the above mentioned calibration of the output level by gating the driver fingers. The control code for calibrating the driving strength is provided through gating data provided to the driver fingers of the binary calibratable main driver 10a by a driver control bus signal P-Fen<2:0>.

The usage of the same basic driver finger cell for the main driver 10a and the auxiliary driver 20a of the pull-up part 120a of the preemphasis driver circuit 120 including the NAND gate results in a perfect timing matching between the driver fingers of the main driver 10a and the auxiliary driver 20a and, as a result, between the main driver 10a and the auxiliary driver 20a themselves.

The lower part of FIG. 4 illustrates that a corresponding architecture with calibratable driver fingers is used for the pull-down part 120b the preemphasis driver circuit 120, however using NOR gates for the calibration gating.

In the embodiment of a preemphasis driver circuit 120 according to FIG. 4, the basic driver finger cells of the auxiliary driver 20a, 20b includes the NAND or NOR gate as well for matching of the propagation delay compared to driver finger cells of the main driver 10a, 10b.

However, in order to provide the functionality to delay the data input signal by 1-bit at input of the auxiliary driver 20a, 20b, the already mentioned delay chain of three inverters 320a, 320b is used as unclocked delay element at the input of the respective NAND/NOR gates of the driver fingers for the preemphasis needs.

In one embodiment, the delay of the delay chains including the three inverters 320a, 320b respectively may be adjusted in a way such that—under any process-voltage-temperature (PVT) variations conditions—the delay is less than the duration of 1-bit for the maximum data rate at the data input terminal 2a, 2b.

In a solution according the embodiment of FIG. 4 using inverters 320a, 320b as unclocked delay element, one advantage of the corresponding preemphasis driver circuit 120 is that it is self-adjusting—i.e., that on the one hand the driver strength, i.e., the output level at the output terminal 3 will be kept constant by calibration of the main driver 10a, 10b via the P-Fen<2:0> and N-Fen<2:0> driver control bus signals.

On the other hand the duration of preemphasis pulses generated by the auxiliary driver 20a, 20b and the portion of charge transferred by the preemphasis driver circuit 120 to a load at the output terminal 3 will track the process-voltage-temperature variations. I.e., the duration of preemphasis pulses will be long for the case of slow process-voltage-temperature variations and short for the case of fast process-voltage-temperature variations.

Figure 5:
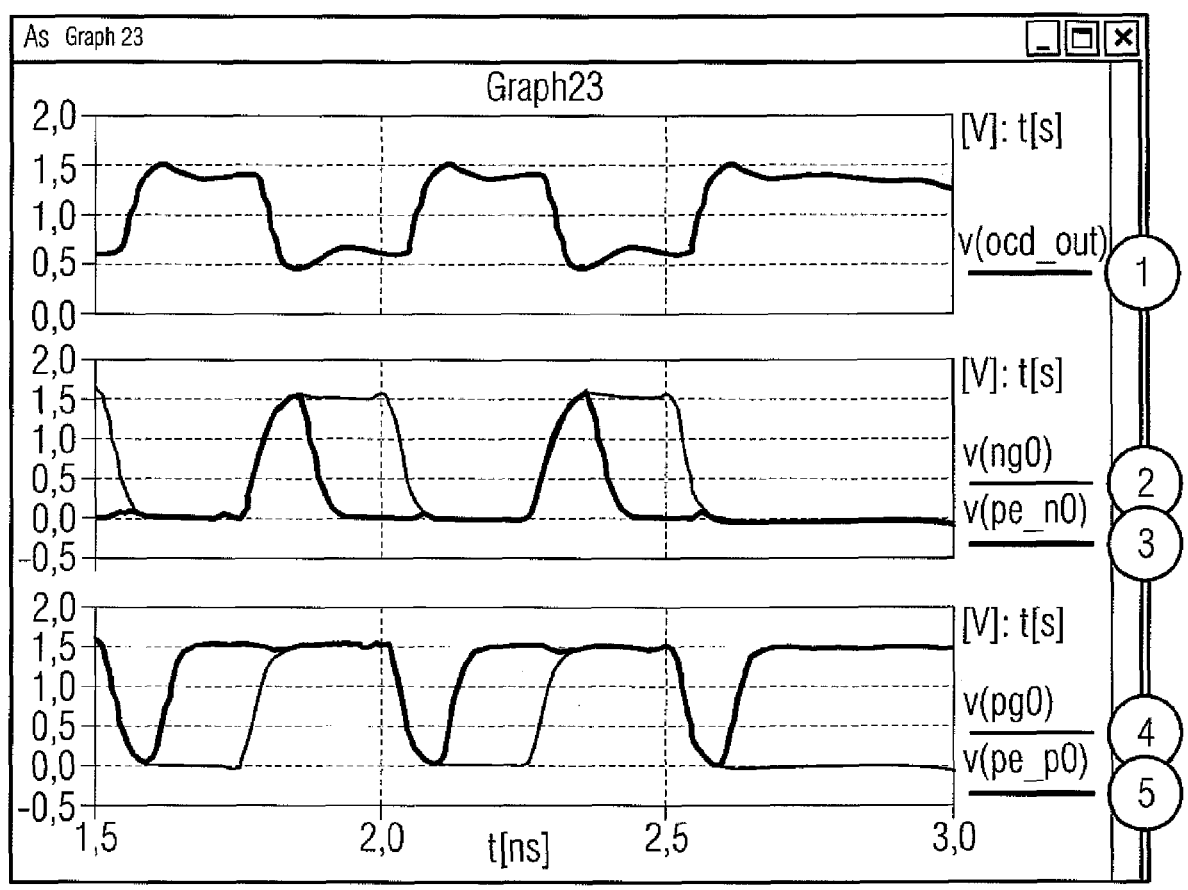
FIG. 5 illustrates examples of data signal shapes using the preemphasis driver circuit of FIG. 4 for a case with fast process-voltage-temperature variations.

FIG. 5 illustrates examples of data signal shapes using the preemphasis driver circuit 120 of FIG. 4 for a case with fast process-voltage-temperature variations. In FIG. 5, the data signal shape illustrated in the uppermost diagram and designated with the number 1 represents an example of a data signal at the output terminal 3 illustrating overshoots or undershoots at every signal edge as a result of preemphasis.

Furthermore, the data signal shape illustrated in the diagram in the middle of FIG. 5 with a thin trace and designated with the number 2 represents an example of a signal at the gate terminals of the N-FETs of the main driver 10b corresponding to the signal shape of the data signal at the output terminal 3 as illustrated in the uppermost diagram of FIG. 5.

The signal shape designated with the number 2 and representing an exemplary signal at the gate terminals of the N-FETs of the main driver 10b illustrates no overshoots or undershoots at the signal edges and is inverted as compared to the exemplary signal at the output terminal 3 represented by the signal shape designated with the number 1.

Moreover, the data signal shape illustrated in the diagram in the middle of FIG. 5 with a thick trace and designated with the number 3 represents an example of a signal at the gate terminal of the N-FET of the auxiliary driver 20b corresponding to the signal shape of the data signal at the output terminal 3 as illustrated in the uppermost diagram in FIG. 5.

The signal shape designated with the number 3 represents an exemplary signal at the gate terminal of the N-FET of the auxiliary driver 20b. This signal includes the preemphasis pulses generated by the chain of three inverters 320b cooperating with the NOR gate at the input of the auxiliary driver 20b to provide the functionality to generate pulses whenever the signal at the gate terminals of the N-FETs of the main driver 10b—represented by the signal shape designated with the number 2—has a positive edge.

Hence, since the data input signal at the input terminal 2b is provided to one input of the NOR gate at the input of the auxiliary driver 20b directly, and to the other input of this NOR gate as a delayed version of the input signal—delayed by the chain of three inverters 320b—the latter cooperates with the NOR gate at the input of the auxiliary driver 20b to provide a positive edge detection functionality with respect to the signal at the gate terminals of the N-FETs of the main driver 10b. This positive edge detection functionality can be understood as part of a differentiating functionality with respect to the signal at the input terminal 2b provided by the pull-down part 120b of the preemphasis driver circuit 120.

Further with respect to FIG. 5, the data signal shape illustrated in the lowermost diagram with a thin trace and designated with the number 4 represents an example of a signal at the gate terminals of the P-FETs of the main driver 10a corresponding to the signal shape of the exemplary data signal at the output terminal 3 as illustrated in the uppermost diagram of FIG. 5.

Still further with respect to FIG. 5, the data signal shape illustrated in the lowermost diagram with a thick trace and designated with the number 5 represents an example of a signal at the gate terminal of the P-FET of the auxiliary driver 20a corresponding to the signal shape of the exemplary data signal at the output terminal 3 as illustrated in the uppermost diagram of FIG. 5.

The signal shape designated with the number 5 represents an exemplary signal at the gate terminal of the P-FET of the auxiliary driver 20a. This signal includes the preemphasis pulses generated by the chain of three inverters 320a cooperating with the NAND gate at the input of the auxiliary driver 20a to provide the functionality to generate pulses whenever the signal at the gate terminals of the P-FETs of the main driver 10a—represented by the signal shape designated with the number 4—has a negative edge.

Thus, since the data input signal at the input terminal 2a is provided to one input of the NAND gate at the input of the auxiliary driver 20a directly and to the other input of this NAND gate as a delayed version of the input signal, delayed by the chain of three inverters 320a, the latter cooperates with the NAND gate at the input of the auxiliary driver 20a to provide a negative edge detection functionality with respect to the signal at the gate terminals of the P-FETs of the main driver 10a. This negative edge detection functionality can be understood as part of a differentiating functionality with respect to the signal at the input terminal 2a provided by the pull-up part 120a of the preemphasis driver circuit 120.

Figure 6:
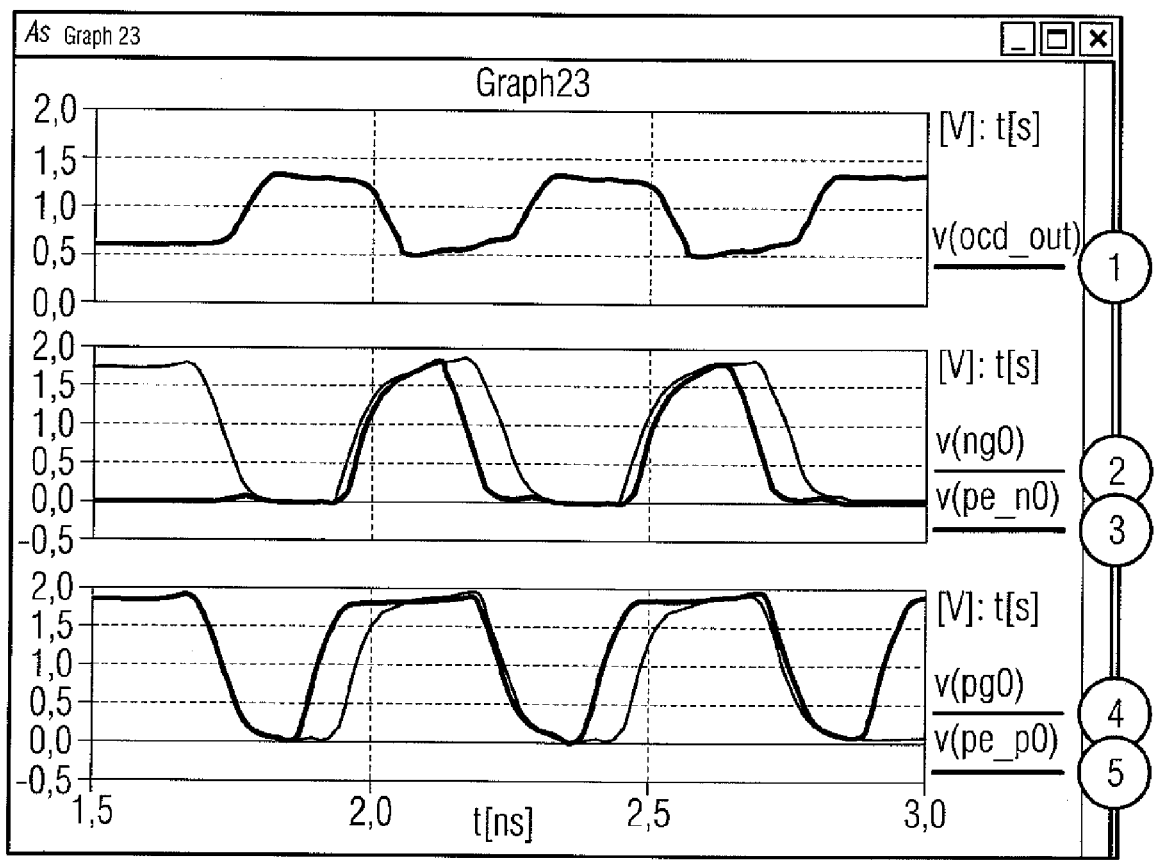
FIG. 6 illustrates examples of data signal shapes using the preemphasis driver circuit of FIG. 4 for a case with slow process-voltage-temperature variations.

FIG. 6 illustrates examples of data signal shapes using the preemphasis driver circuit 120 of FIG. 4 for a case with slow process-voltage-temperature variations. The signal shapes designated with the numbers 1 to 5 illustrated in FIG. 6 correspond to the signal shapes designated with the numbers 1 to 5 in FIG. 5 respectively.

However, the signal shapes designated with the numbers 3 and 5 representing the signals at the gate terminals of the N-FET of the auxiliary driver 20b and of the P-FET of the auxiliary driver 20a respectively, illustrate that the duration of the preemphasis pulses is longer as compared to corresponding signal shapes 3 and 5 in FIG. 5.

This demonstrates that the duration of preemphasis pulses generated by the auxiliary driver 20a, 20b tracks the process-voltage-temperature variations. In one embodiment, the duration of the preemphasis pulses is short for the case of fast process-voltage-temperature variations as illustrated by the exemplary signal shapes designated with the numbers 3 and 5 in FIG. 5 and long for the case of fast process-voltage-temperature variations as shown by the exemplary signal shapes designated with the numbers 3 and 5 in FIG. 6.

Figure 7:
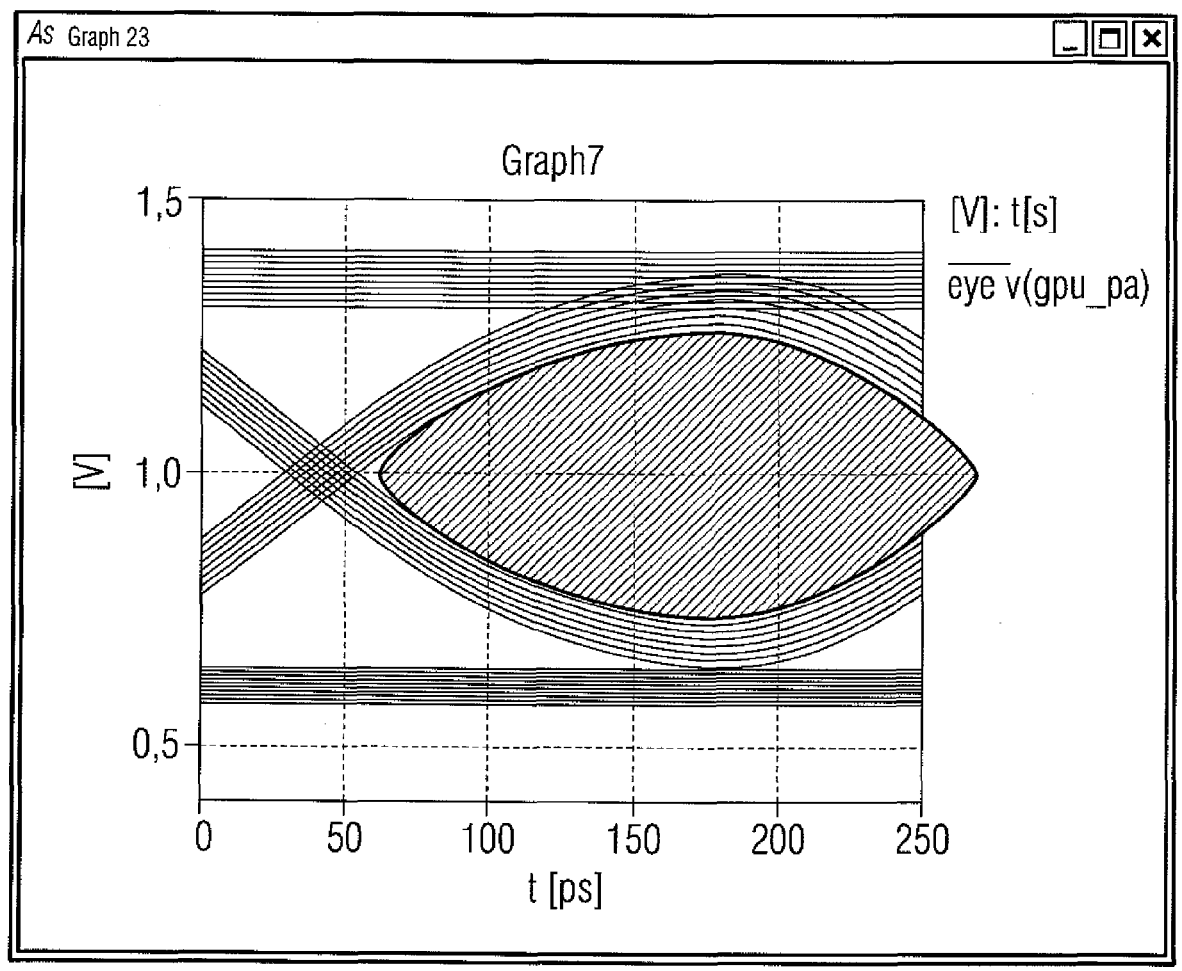
FIG. 7 illustrates an eye-diagram of a simulated data signal after transmission over a predefined PCB trace at a predefined receiver impedance with preemphasis switched off.
Figure 8:
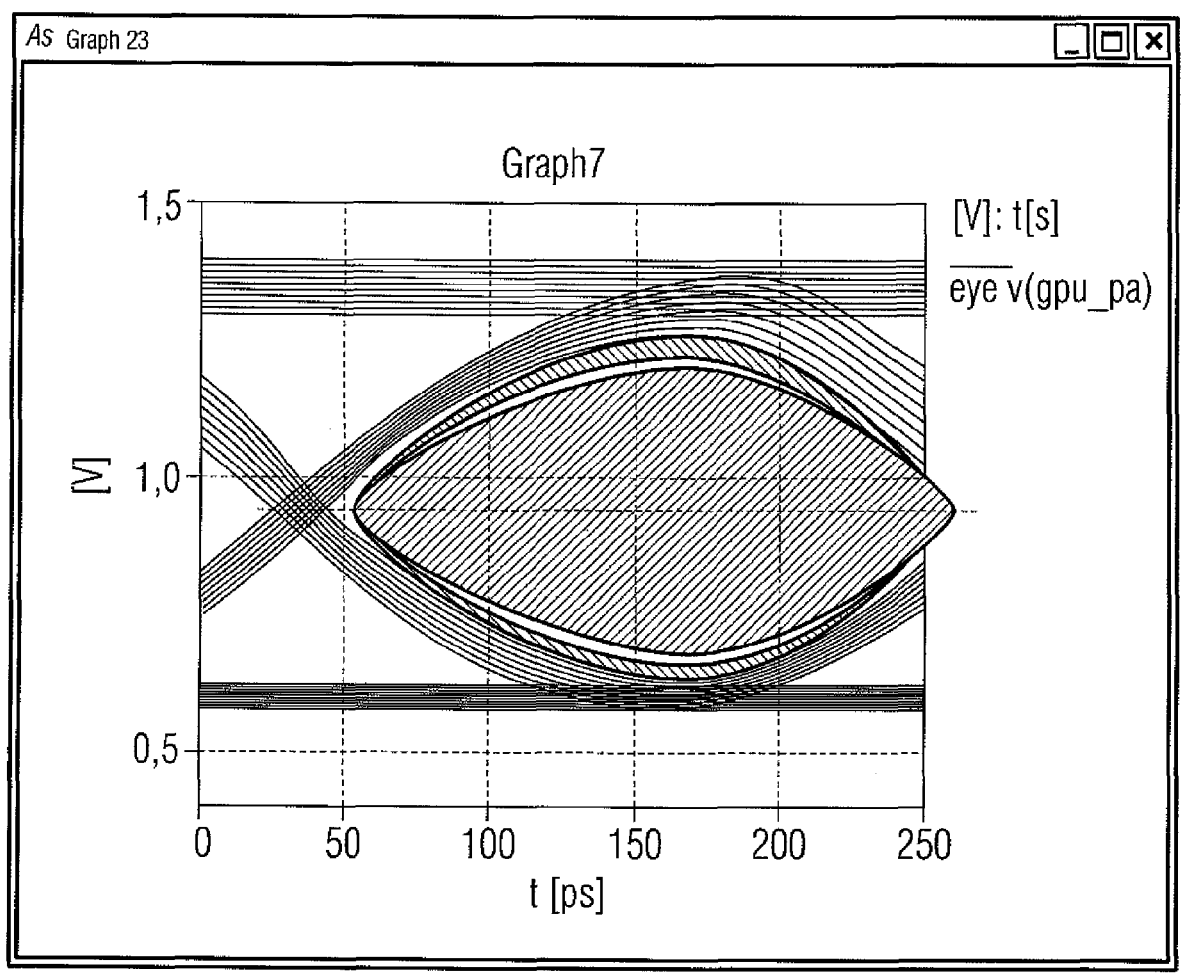

FIGS. 7 and 8 show eye-diagrams of simulated data signals under the predefined transmission conditions. Eye diagrams represent a form of diagram wherein a transient data signal shape under examination is split into consecutive sections with the duration of one or more bits at the respective data rate of the data, and these consecutive sections are then shown overlaid in the same time interval of one or more bits.

In eye diagrams, a measure of quality of the analyzed signal is the area of the eye aperture, i.e., the larger this area, the easier it is for a circuit receiving the analyzed data signal to reconstruct the correct digital signal values of the analyzed data signal.

In order to point out the possible gain in area of eye aperture with a preemphasis driver according to the embodiment shown in FIG. 4, FIG. 7 first shows an eye-diagram of a simulated data signal at data rate of 4 Gb/s using a driver with 40 Ohms pull-down resistor and 60 Ohms pull-up resistor after transmission over a PCB trace with 63 mm length with a trace impedance of 44 Ohms, a receiver capacitance of 2 pF and a receiver termination of 60 Ohms with preemphasis switched off.

FIG. 8 shows an eye-diagram of a simulated data signal under the same transmission conditions as in FIG. 7 but with preemphasis switched on. To clarify the gain in eye aperture, the corresponding area is shown hatched differently in FIG. 8.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system comprising:
a preemphasis driver circuit comprising:
an main driver driven by an input signal;
an auxiliary driver, both to drive at least one loaded transmission line in parallel;
wherein the input signal is differentiated using at least one unclocked delay element to drive the auxiliary driver; and
wherein an output level of the main driver is calibratable, and wherein the main driver comprises a plurality of driver fingers to allow a binary coding of the output level of the main driver by placing the driver fingers a corresponding number of times.

2. The system of claim 1, wherein the at least one unclocked delay element is an RC-circuit.

3. The system of claim 1, wherein the at least one unclocked delay element is an inverter.

4. The system of claim 1, wherein the main driver and the auxiliary driver are based on the same schematic and the same layout cell.

5. The system of claim 1, wherein the least one unclocked delay element is configured to generate preemphasis pulses whose duration is self-adjusting to process-voltage-temperature variations.

6. The system of claim 1, wherein the driver fingers comprise at least one logic gate for calibrating the output level of the main driver by gating the driver fingers.

7. The system of claim 6, wherein the preemphasis driver circuit is configured to keep its output level constant by a driver calibration bus controlling the logic gates of the driver fingers.

8. The system of claim 7, wherein the preemphasis driver circuit comprises a differential input terminal and is configured as a pull-up/pull-down driver comprising a symmetrical schematic and layout structure for the pull-up and the pull-down part of the preemphasis driver circuit based on a corresponding schematic and layout cell for the main drivers and the auxiliary drivers of the pull-up and the pull-down part of the preemphasis driver circuit.

9. A method for operating a system including preemphasizing an input signal to drive an output terminal, the method comprising:
driving the output terminal by the input signal using a main driver and an auxiliary driver in parallel;
wherein the input signal is differentiated using at least one unclocked delay element to drive the auxiliary driver,
wherein the process of driving the output terminal by the input signal using the main driver comprises calibrating an output level of the main driver; and
wherein the process of calibrating the output level of the main driver comprises using a plurality of driver fingers to allow a binary coding of the output level of the main driver by placing the driver fingers a corresponding number of times.

10. The method of claim 9, wherein the main driver and the auxiliary driver are based on the same schematic and the same layout cell.

11. The method of claim 9, wherein the at least one unclocked delay element is an inverter.

12. The method of claim 9, wherein the process of calibrating the output level of the main driver comprises using at least one logic gate in each of the plurality of driver fingers for gating the driver fingers.

13. The method of claim 12, wherein the process of calibrating the output level of the main driver comprises keeping an output level at the output terminal constant by a driver calibration bus controlling the logic gates of the driver fingers.

* * * * *